June 16, 1959 G. K. HAUSE 2,890,769
BRAKE ACTUATOR
Filed Aug. 2, 1956
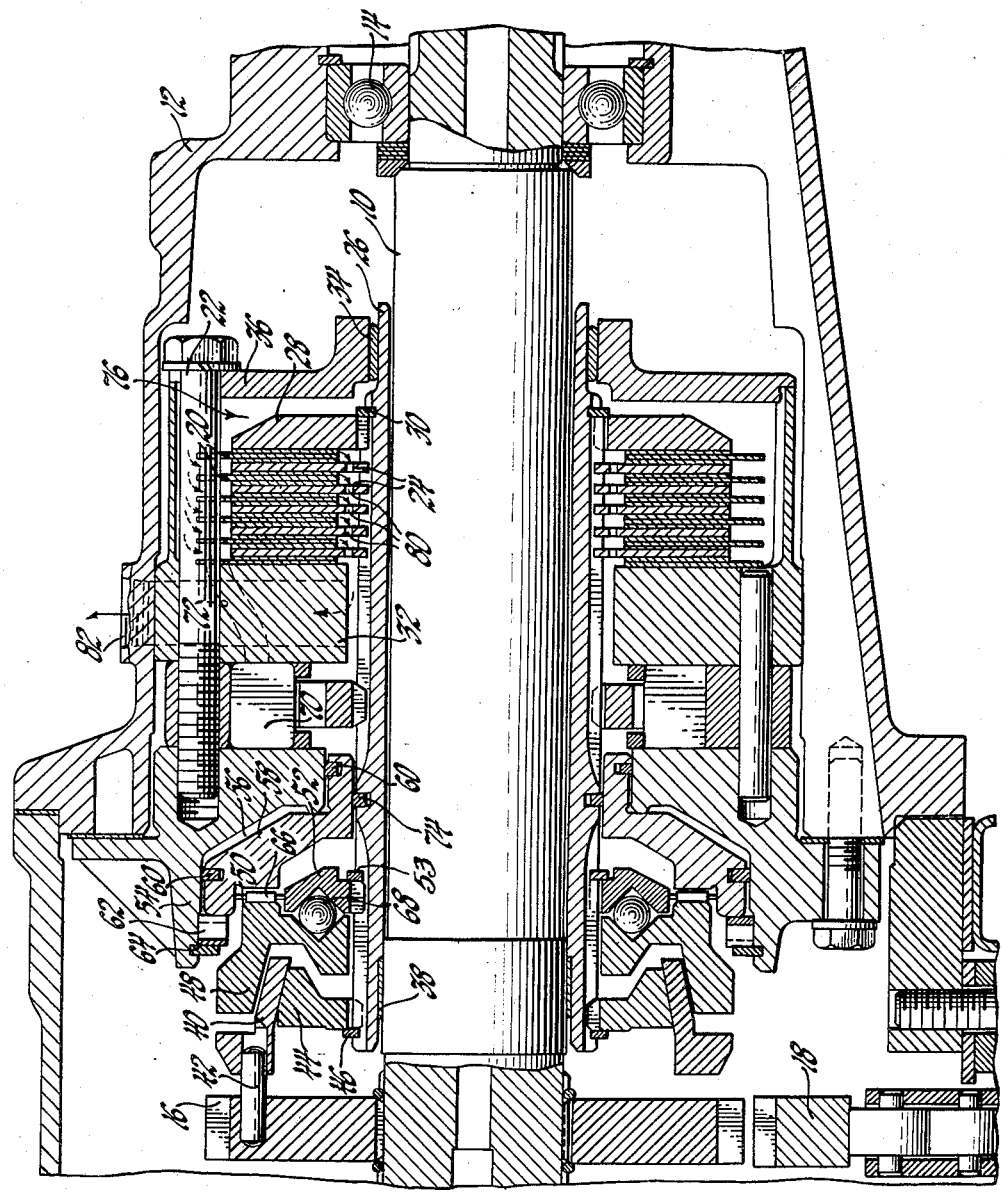
INVENTOR.
Gilbert K. Hause
BY
T. L. Chisholm
ATTORNEY United States Patent Office 2,890,769
Patented June 16, 1959

2,890,769

BRAKE ACTUATOR

Gilbert K. Hause, Franklin, Mich., assignor to General Motors Corporation, Detroit, Mich., a corporation of Delaware Application August 2, 1956, Serial No. 601,672

10 Claims. (Cl. 188—72)

This invention relates to automobile transmissions, for example of the type shown in the application for U.S. patent by Oliver K. Kelley, filed July 17, 1956, as Serial Number 598,370. It relates particularly to an improved brake for the transmission output shaft, to an actuator for the brake and to a control system therefor, including a cooling system.

One of the objects of the invention is to provide an improved arrangement and construction for brake adapted to retard the output shaft of a transmission and so retard the car which the transmission drives. The invention is particularly adapted to use during long passages downhill, where extensive and prolonged cooling is required. It is particularly an object to provide a minimum of parts which are rotated by the propeller shaft during normal driving, so that the braking elements which are to be driven are not rotated, and to provide an improved actuator for instantly connecting the driven braking elements to the shaft and for connecting a cooling pump to the shaft while engaging the driven braking elements and the stationary braking elements.

Other objects and advantages of the invention will be apparent from the following description and from the accompanying drawings.

The single figure of the drawing is a longitudinal section through a portion of a transmission showing a brake and actuator therefor embodying one form of the invention.

In the drawing, 10 designates the output shaft of a transmission which is driven by any suitable power transmitting device (not shown); for example, as illustrated in the Kelley application above identified, the disclosure of which is incorporated herein by reference. The shaft may drive the propeller shaft of an automobile (not shown) which may be connected to the right of the shaft 10. The shaft 10 is suitably supported in any customary manner in a stationary casing 12 by means including a bearing 14. The shaft may also be provided with a parking brake or lock including a gear 16 keyed to the shaft and engageable by a pawl 18 to lock the shaft when the car is parked.

The brake proper includes one or more stationary friction elements such as discs or plates 20 of any suitable form splined to the casing on bolts or studs 22 and one or more plates or discs 24 which are to be driven and are splined on a slidable hollow brake drive shaft 26 carrying a clamp or disc 28 secured to the shaft 26 by a stop or snap ring 30 by which the friction elements can be clamped together against a stationary abutment 32 whenever the brake drive shaft 26 is moved to the left. The brake drive shaft 26 is supported at its right end by a bearing sleeve 34 supported in a web 36 and at its left end by a bearing sleeve 38 on the output shaft 10. The sleeve 26 is referred to as a support in some of the claims herein.

In order to connect the brake drive shaft 26 to the output shaft for rotation and to move it to the left to engage the brake, I provide the following mechanism.

A friction clutch cone 40 is supported on a plurality of pins 42 which are fixed to the parking gear 16 and slidable in cone 40 so that cone 40 always turns with the output shaft 10 and is axially slidable with respect to it. Inside the cone 40 is a second cone 44 keyed to the hollow brake drive shaft 26 and held against movement to the left with respect to the shaft 26 by a stop or snap ring 46. Outside of the cone 40 is a third friction cone 48 forming a part of a disc 50 which is journaled on and slidable with respect to the hollow shaft 26. Axially adjacent the disc 50 is an abutment 52 which is keyed to the brake drive shaft 26 and held against movement to the right with respect to the shaft 26 by a stop or snap ring 53. A cylinder 54 is fixed to the casing and has a pressure chamber 56 formed on its inside to receive a piston 58 slidable in the cylinder and sealed to hold pressure within the space 56 by any suitable seals 60. The piston is urged to the right as the drawing is seen by a waved circular return spring 62 held by snap ring 64. The piston may be moved to the left by hydraulic pressure in the chamber 56 to move the cone 48 to the left through a thrust bearing 66.

When the cone 48, moving to the left under the influence of pressure in the cylinder 56, engages the cone 40 it pushes the cone 40 against the cone 44 and the cone 44 against the snap ring 46, thus moving the brake drive shaft 26 to the left to cause clamp 28 to press the plates 20—24 together. This both engages the brake and connects its driven part for rotation to the output shaft. In order to insure firm engagement of the clutch cones 44—40—48 before the brake plates 20—24 are tightly engaged and thus insure that any slip will be taken in the plates rather than in the cones, the cone 48 is equipped with any suitable self-energizing device such as the balls 68 in oppositely facing conical depressions in the plates or discs 50 and 52. As soon as the cone 48 starts to engage the cone 40, the disc 50 is rotated with respect to the disc 52 which is temporarily held from rotation by the inertia of the parts including the brake drive shaft 26 and all parts keyed to it, and/or by force of initial light engagement of plates 20—24. This relative rotation wedges the cones firmly into contact. Pressure in the chamber 56 continues to urge the piston 58 to the left and thus through the cones 48—40—44 and the snap ring 46 pushes the brake drive shaft 26 to the left with a force proportional to the pressure in the cylinder. This is the braking force which causes the clamp 28 to press all of the plates together against the stop 32 and this retards rotation of the output shaft.

A cooling pump 70 of any suitable form (for example as shown in the application for United States patent filed by Walter B. Herndon and Richard L. Thorman on August 19, 1954, Serial No. 450,908, now Patent No. 2,805,628) is keyed to the hollow shaft 26 so that it rotates whenever the brake drive shaft 26 rotates and supplies cooling oil to the brake plates 20—24. The pump 70 may take in oil from any suitable sump as shown in the application of Kelley referred to and may discharge oil to any suitable point in the brake mechanism as indicated schematically by the outlet 72. The web 36, bearing 34, hollow shaft 26, seal 74, piston 58, one of the seals 60 and the cylinder 54 inclose a space 76 within the casing 12 which space is adapted to be kept filled with oil and to have oil circulated through any suitable grooves in the friction plate and then to a suitable cooler by the pump 70 whenever the brake is applied. The oil may circulate, as shown by the arrows, passing through openings 80 in the plates 24 and leaving the space 76 by an outlet 82 connected to the sump.

The brake is applied whenever desired by admitting fluid under pressure by any suitable control system (not shown) to the pressure chamber 56. The brake is released by interrupting the supply of fluid to the chamber and venting the chamber in any suitable known manner. When the chamber is vented the spring 62 returns the piston 58 to the right and allows the cone surfaces 44—40—48 to disengage.

It is desirable to have the brake discs or plates always coated with oil or immersed in oil so that they are lubricated at the instant the brake starts to operate. It is also desirable to have the pump start to operate instantly upon engagement of the cone clutch surfaces 44—40—48. To this end any suitable means is provided for example, as shown in Kelley application referred to, to constantly supply oil to the space 76 in order to keep the pump 70 submerged in oil and therefore primed and to keep the brake plates 22—26 submerged in oil.

I claim:

1. The combination of a rotatable shaft to be braked, a first friction element which cannot rotate, a support which can rotate both absolutely and with respect to the shaft and can move axially with respect to the shaft, a second friction element adjacent the first friction element and rotationally fixed to the rotatable support, means on the support for moving the second friction element into contact with the first whenever the support is moved axially in one direction and means for successively connecting the support to the shaft to rotate the second friction element and moving the support axially to urge the second friction element into contact with the first friction element.

2. The combination of a rotatable shaft to be braked, a first friction element which cannot rotate, a support which can rotate both absolutely and with respect to the shaft and can move axially with respect to the shaft, a second friction element adjacent the first friction element and rotationally fixed to the rotatable support, means on the support for moving the second friction element into contact with the first whenever the support is moved axially in one direction, means for connecting the support to the shaft to rotate the second friction element and moving the support axially to urge the second friction element into contact with the first friction element and means responsive to rotation of the support for circulating coolant in thermal contact with the friction elements.

3. The combination of a rotatable shaft to be braked, a first friction element which cannot rotate, a support which can rotate both absolutely and with respect to the shaft and can move axially with respect to the shaft, a second friction element carried by the rotatable support, and non-rotatable with respect thereto, a third friction element carried by the support and non-rotatable with respect thereto, a fourth friction element carried by the shaft and nonrotatable with respect thereto and means for urging the first and second friction elements into contact with each other and the third and fourth friction elements into contact with each other.

4. The combination of a rotatable shaft to be braked, a first friction element which cannot rotate, a support which can rotate both absolutely and with respect to the shaft and can move axially with respect to the shaft, a second friction element carried by the rotatable support and nonrotatable with respect thereto, a third friction element carried by the support and non-rotatable with respect thereto, a fourth friction element carried by the shaft adjacent the third friction element and axially movable with respect thereto and non-rotatable with respect to the shaft, a fifth friction element carried by the support adjacent the fourth friction element and axially movable with respect thereto and rotatable with respect to the support, and means for urging the first and second friction elements into contact with each other and for urging the fifth friction element into contact with the fourth and toward the third friction element to engage the third, fourth and fifth friction elements.

5. The combination of a rotatable shaft to be braked, a first friction element which cannot rotate, a support which can rotate both absolutely and with respect to the shaft and can move axially with respect to the shaft, a second friction element carried by the rotatable support and non-rotatable with respect thereto, a third friction element carried by the support and non-rotatable with respect thereto, a fourth friction element carried by the shaft adjacent the third friction element and axially movable with respect thereto and non-rotatable with respect to the shaft, a fifth friction element carried by the support adjacent the fourth friction element and axially movable with respect thereto and rotatable with respect to the support, means for urging the first and second friction elements into contact with each other and for urging the fifth friction element into contact with the fourth and toward the third friction elements to engage the third, fourth and fifth friction elements, and self-energizing means responsive to rotation of the fifth friction element with respect to the support for urging the fifth friction element toward the third and fourth friction elements.

6. The combination of a rotatable shaft to be braked, a first friction element which cannot rotate, a support which can rotate both absolutely and with respect to the shaft and can move axially with respect to the shaft, a second friction element carried by the rotatable support, and non-rotatable with respect thereto, a third friction element carried by the support and non-rotatable with respect thereto, a fourth friction element carried by the shaft adjacent the third friction element and axially movable with respect thereto and non-rotatable with respect to the shaft, a fifth friction element carried by the support adjacent the fourth friction element and axially movable with respect thereto; and rotatable with respect to the support, means for urging the first and second friction elements into contact with each other and for urging the fifth friction element into contact with the fourth and toward the third friction element to engage the third, fourth and fifth friction elements, self-energizing means responsive to rotation of the fifth friction element with respect to the support for urging the fifth friction element toward the third and fourth friction elements and a pump connected to the support for circulating coolant in thermal contact with the first and second friction members when the support is rotated.

7. The combination of a non-rotatable brake element, a rotatable shaft to be braked, a support which can rotate both absolutely and with respect to the shaft and can move axially with respect to the shaft, a second brake element carried by the support and non-rotatable with respect thereto, means on the support for urging the brake elements into engagement in response to axial movement of the support in one direction, a first clutch element carried by the support and non-rotatable with respect thereto, a second clutch element rotated by the shaft and axially movable with respect thereto and means for successively engaging the clutch elements to connect rotationally the shaft and support and for moving the clutch elements axially to move the support axially and thereby engage the brake elements.

8. The combination of a non-rotatable brake element, a rotatable shaft to be braked, a support which can rotate both absolutely and with respect to the shaft and can move axially with respect to the shaft, a second brake element carried by the support and non-rotatable with respect thereto, a first clutch element rotationally and axially fixed to the support, a second clutch element rotated by the shaft and axially movable into contact with the first clutch element and means for engaging the clutch elements to connect rotationally the shaft and support and for moving the clutch elements axially to move the support axially and thereby engage the brake elements, said last-mentioned means including a friction element which is rotatable and which is axially movable with respect to the clutch elements, means for moving the friction element axially to engage and be rotated by the second clutch element, and means responsive to initial rotation of the friction element relative to the support for urging the friction element toward the clutch elements to increase the engaging force of the clutch elements.

9. The combination of a non-rotatable brake element, a rotatable shaft to be braked, a sleeve surrounding the shaft, the sleeve being rotatable both absolutely and with respect to the shaft and movable axially with respect to the shaft, a second brake element carried by the sleeve and non-rotatable with respect thereto, a first clutch element fixed to the sleeve, a second clutch element splined to the shaft and axially movable with respect to the first clutch element and the sleeve, a friction element which is axially movable with respect to the sleeve and clutch elements, and an expansible chamber motor for urging the friction element against the second clutch element to urge the second clutch element against the first clutch element to urge the sleeve axially to engage the brake elements.

10. The combination of a non-rotatable brake element, a rotatable shaft to be braked, a sleeve surrounding the shaft, the sleeve being rotatable both absolutely and with respect to the shaft and movable axially with respect to the shaft, a second brake element carried by the sleeve and non-rotatable with respect thereto, a first clutch element fixed to the sleeve, a second clutch element splined to the shaft and axially movable with respect to the first clutch element and the sleeve, a friction element which is axially movable and rotatable with respect to the sleeve and clutch elements, an expansible chamber motor for urging the friction element against the second clutch element to be rotated thereby and to urge the second clutch element against the first clutch element to urge the sleeve axially to engage the brake elements, an abutment fixed to the sleeve and means between the abutment and the friction element responsive to rotation of the friction element relative to the sleeve for urging the friction element toward the clutch elements with a force which is independent of the expansible chamber motor.

References Cited in the file of this patent

UNITED STATES PATENTS

| | | |
|---|---|---|
| 852,311 | Arbey | Apr. 30, 1907 |
| 1,159,663 | Guillery | Nov. 9, 1915 |
| 1,320,246 | Langdon | Oct. 28, 1919 |
| 2,564,281 | Rockwell | Aug. 14, 1951 |
| 2,743,792 | Ranson | May 1, 1956 |